United States Patent
Kuo et al.

(10) Patent No.: US 10,356,223 B1
(45) Date of Patent: Jul. 16, 2019

(54) CONNECTION MIGRATION FOR INTERNET OF THINGS (IOT) DEVICES

(71) Applicant: Amazon Technologies, Inc., Seattle, WA (US)

(72) Inventors: Calvin Yue-Ren Kuo, Irvine, CA (US); Jonathan I. Turow, Seattle, WA (US); Tristam Kyle MacDonald, Boston, MA (US); Justin Robert Knoepfler, Seattle, WA (US); Yadunandan Parthasarathy, Bellevue, WA (US); Aditya Bhalla, Shoreline, WA (US); Sudarshan Anand Chitre, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 147 days.

(21) Appl. No.: 15/073,554

(22) Filed: Mar. 17, 2016

(51) Int. Cl.
*H04L 29/06* (2006.01)
*H04L 12/801* (2013.01)

(52) U.S. Cl.
CPC ............ *H04L 69/08* (2013.01); *H04L 47/196* (2013.01); *H04L 69/161* (2013.01); *H04L 69/169* (2013.01)

(58) Field of Classification Search
CPC ..... H04L 69/08; H04L 69/161; H04L 69/169; H04L 47/196; H04L 29/08639; H04L 67/1002; H04L 67/1004; H04L 67/148; H04L 65/1083; H04L 29/06149; H04L 29/06156
USPC ....... 709/203, 226, 227, 238, 241, 230, 232, 709/235, 244
See application file for complete search history.

(56) References Cited

U.S. PATENT DOCUMENTS

| | | | | |
|---|---|---|---|---|
| 6,601,101 B1 * | 7/2003 | Lee | ..................... | H04L 67/1008 709/202 |
| 7,152,111 B2 * | 12/2006 | Allred | ................... | H04L 29/125 709/227 |
| 7,694,305 B2 * | 4/2010 | Karlsson | ............. | G06F 11/3447 709/224 |
| 8,934,366 B2 * | 1/2015 | Hui | ......................... | H04L 41/12 370/252 |
| 9,077,630 B2 * | 7/2015 | Backholm | ............... | H04L 47/20 |
| 2002/0133596 A1 * | 9/2002 | Border | ............... | H04B 7/18582 709/227 |
| 2004/0062267 A1 * | 4/2004 | Minami | .................. | H04L 29/06 370/463 |

(Continued)

*Primary Examiner* — Michael Won
(74) *Attorney, Agent, or Firm* — Thorpe North & Western, LLP.

(57) ABSTRACT

Technology is described for migrating connections for Internet of Things (IoT) devices. Data packets may be received from an IoT device for forwarding to a first physical host in a computing service environment. A determination to migrate the connection for the IoT device from the first physical host to a second physical host in the computing service environment may be performed when a throughput of the data packets received from the IoT device for the first physical host exceeds a defined threshold. A connection migration procedure may be initiated to migrate the connection for the IoT device from the first physical host to the second physical host. The connection migration procedure may include an exchange of session state information for the IoT device from the first physical host to the second physical host to enable the migration of the connection to the second physical host.

20 Claims, 11 Drawing Sheets

(56) References Cited

U.S. PATENT DOCUMENTS

| | | | |
|---|---|---|---|
| 2009/0063665 A1* | 3/2009 | Bagepalli | H04L 63/166 709/222 |
| 2011/0243065 A1* | 10/2011 | Sarma | H04W 40/02 370/328 |
| 2011/0289200 A1* | 11/2011 | Patil | G06F 9/5027 709/223 |
| 2012/0239725 A1* | 9/2012 | Hartrick | H04L 69/161 709/203 |
| 2013/0219046 A1* | 8/2013 | Wetterwald | H04L 45/38 709/224 |
| 2014/0064249 A1* | 3/2014 | Lee | H04W 36/023 370/331 |
| 2014/0108777 A1* | 4/2014 | Nilakantan | H04L 67/34 713/2 |
| 2014/0129734 A1* | 5/2014 | Vasseur | H04L 45/121 709/241 |
| 2014/0173196 A1* | 6/2014 | Beveridge | G06F 3/061 711/114 |
| 2014/0317168 A1* | 10/2014 | Suresh | H04L 67/10 709/203 |
| 2015/0326609 A1* | 11/2015 | Cruz Mota | H04L 41/30 726/1 |
| 2016/0006837 A1* | 1/2016 | Reynolds | H04W 84/18 709/203 |
| 2017/0041231 A1* | 2/2017 | Seed | H04W 4/70 |
| 2017/0075591 A1* | 3/2017 | Espeseth | G06F 3/0613 |
| 2017/0339257 A1* | 11/2017 | Kanagarathinam | H04L 45/24 |
| 2018/0139272 A1* | 5/2018 | Puri | G06F 9/5088 |

* cited by examiner

CONNECTION MIGRATION FOR INTERNET OF THINGS (IOT) DEVICES

BACKGROUND

The Internet of Things (IoT) is the interconnection of computing devices scattered across the globe within the existing Internet infrastructure. Each computing device may be assigned a unique identifier, such as an Internet Protocol version 6 (IPv6) address, an IPv4 address, a uniform resource identifier (URI), or a global unique identifier. The computing devices may be able to capture information, and then securely communicate the information over a network to other computing devices or a centralized server computer.

These IoT computing devices may be embedded in a variety of products, such as home appliances, manufacturing devices, industrial printers, automobiles, thermostats, smart traffic lights, etc. The Internet of Things may be useful for a number of applications, such as environmental monitoring, infrastructure management, industrial applications, building and home automation, energy management, medical and healthcare systems, transport systems, etc.

DETAILED DESCRIPTION

Figure 1:
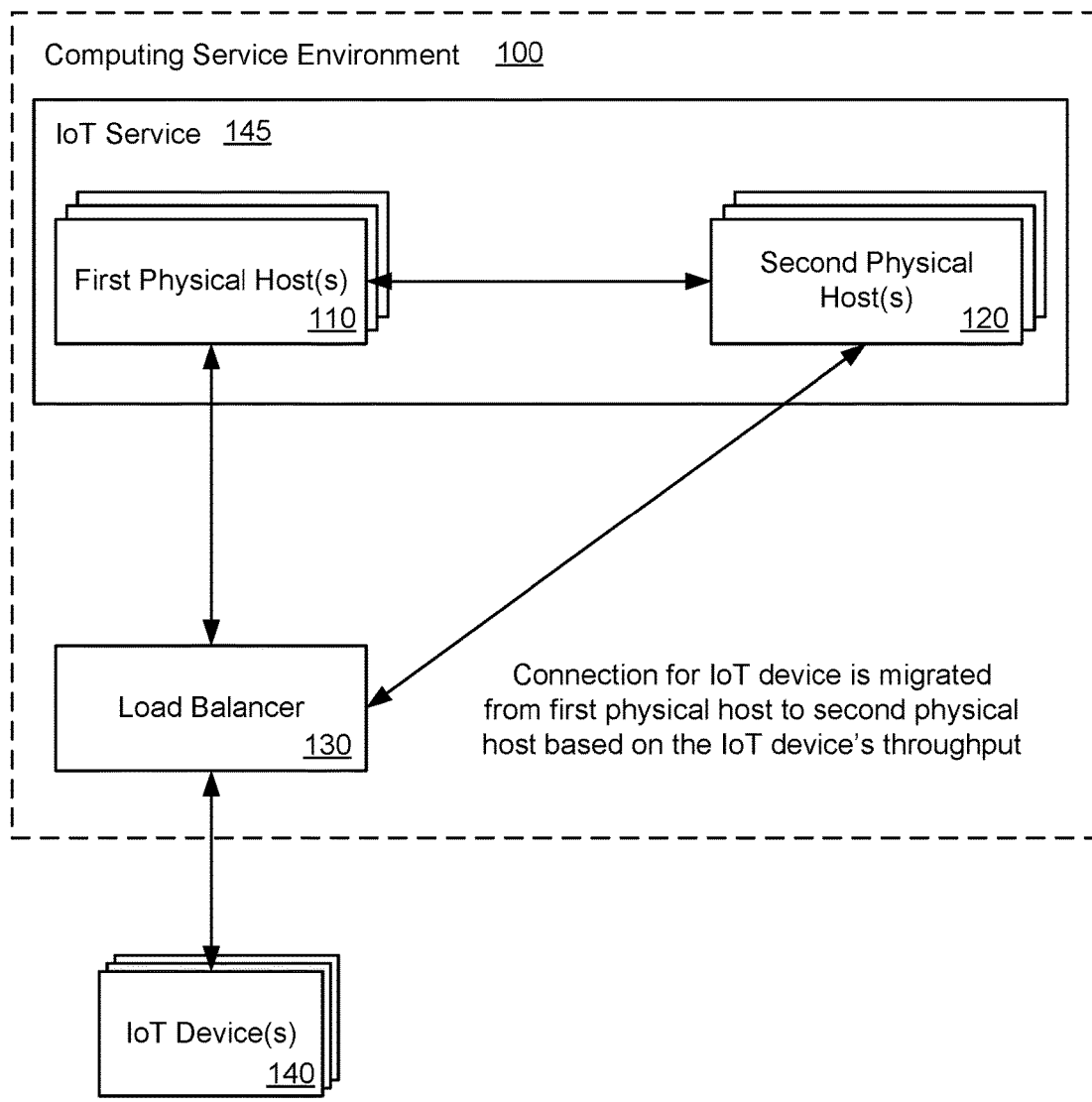
FIG. 1 illustrates a system and related operations for migrating a connection for an Internet of Things (IoT) device from a first physical host to a second physical host using a load balancer in a computing service environment according to an example of the present technology.

A technology is described for migrating connections for Internet of Things (IoT) devices between physical hosts in a computing service environment. For example, an IoT device may be connected to a first physical host via a transmission control protocol (TCP) connection. The first physical host may be able to host a large number of open but relatively inactive connections to IoT devices. For example, the first physical host may have hundreds, thousands, or even millions of connections to IoT devices that are open but are not actively communicating any significant amount of data. Because the open connections are close to inactive, the first physical host can maintain the large number of connections which the first physical host would otherwise be unable to maintain. A load balancer may be an entity in the computing service environment that forwards data packets from the IoT device to the first physical host using the connection between the first physical host and the IoT device. Similarly, the load balancer may forward data packets from the first physical host to the IoT device. Such a load balancer is typically configured to distribute connections from IoT devices to one of multiple physical hosts or servers. In one example, the physical hosts or servers may execute computing instances that are used to host or maintain the connections with the IoT devices. The load balancer may be positioned in front of the first physical host in the computing service environment. In other words, the first physical host may be on the back end side of the load balancer. As an example, the IoT device may periodically (e.g., infrequently) send keep alive messages (or ping messages) to the first physical host via the load balancer to maintain the connection between the IoT device and the first physical host.

In one configuration, the first physical host may be configured to handle an increased number of connections for IoT devices and a reduced throughput per connection. In other words, the first physical host may be configured to support a relatively large number of connections with IoT devices, as long as the IoT devices transmit a relatively small amount of data (e.g., keep alive messages). However, when the IoT devices transmit data packets at a throughput that exceeds a defined threshold (e.g., data packets that are not keep alive messages), the first physical host may be unable to handle the relatively large number of connections. The throughput of the data may refer to a number of bytes (or bits) transmitted per second from the IoT device.

In one configuration, the load balancer may detect that a throughput of the data packets received from the IoT device for forwarding to the first physical host exceeds the defined threshold. As an example, based on the throughput, the load balancer may infer that data packets received from the IoT device is not a keep alive message, but rather is sensor data to be forwarded to the first physical host. Alternatively, the load balancer may detect that the IoT device is due to send data packets at a throughput that exceeds the defined threshold based on an expected traffic pattern of the IoT device. As an example, the load balancer may detect that the IoT device is expected to send periodic sensor data to the first physical host in the next five minutes, and a throughput for sending the sensor data may exceed the defined threshold.

In one configuration, the load balancer may determine to migrate the connection for the IoT device from the first physical host to a second physical host in the computing service environment. The load balancer may determine to migrate the connection based on the throughput of the data received from the IoT device or the expected traffic pattern of the IoT device. The second physical host may be configured to handle a decreased number of connections for IoT devices, but an increased throughput per connection. In other words, although the second physical host may be configured to support a relatively smaller number of connections with IoT devices as compared to the first physical host, the second physical host may handle data packets (e.g., sensor data) from IoT devices at a throughput that exceeds the defined threshold. Therefore, the second physical host may be better suited to maintain the active connection with the IoT device as compared to the first physical host.

In one example, the load balancer may select the second physical host to take over the connection with the IoT device based on a present load at the second physical host in relation to other physical hosts in the computing service environment. As an example, between three candidate physical hosts that are at 30% load capacity, 50% load capacity and 75% load capacity, respectively, the load balancer may select the physical host at 30% load capacity to take over the connection with the IoT device. Alternatively, the load balancer may select the second physical host based on a round robin technique, such that the same physical host may not take over connections for multiple IoT devices simultaneously. In addition, when selecting the second physical host, the load balancer may consider a predicted traffic pattern of the IoT device in relation to predicted traffic patterns for other IoT devices that are currently connected to the first physical host. Based on the predicted traffic patterns, the load balancer may be less likely to migrate connections for multiple IoT devices to the same second physical host. Rather, by knowing the predicted traffic patterns, the load balancer may be more likely to spread the migration of connections for multiple IoT devices to multiple physical hosts, which may prevent a particular physical host from being overloaded.

In one configuration, the load balancer may initiate a connection migration procedure with the first physical host and the second physical host to migrate the connection for the IoT device from the first physical host to the second physical host. For example, the load balancer may use a session initiation protocol (SIP) to perform the connection migration from the first physical host to the second physical host. The load balancer may exchange session state information for the IoT device from the first physical host to the second physical host when performing the migration. The session state information may include a current package sequence number being transmitted, a location in a current window, and various other parameters to transfer the connection for the IoT device from the first physical host to the second physical host.

In one example, after the connection migration procedure is completed, subsequent data packets received at the load balancer from the IoT device may be forwarded to the second physical host. In other words, the IoT device may be connected to the second physical host via the load balancer, as opposed to the first physical host. Since a throughput of the subsequent data packets may exceed the defined threshold, the second physical host may be configured to handle the data packets more efficiently as compared to the first physical host. In addition, based on the present technology, the first physical host may generally not handle both IoT devices with a relatively low throughput and IoT devices with a relatively high throughput at the same time, which can improve efficiency and reduce operating costs at the first physical host.

FIG. 1 illustrates an exemplary system and related operations for migrating a connection for an Internet of Things (IoT) device 140 from a first physical host 110 to a second physical host 120 using a load balancer 130 in a computing service environment 100. The first physical host 110 and the second physical host 120 may be part of an IoT service 145 that operates in the computing service environment 100. The IoT device 140 may be connected to the first physical host 110 via the load balancer 130. The IoT device 140 may send data packets (e.g., keep alive messages) to the first physical host 110 via the load balancer 130. The load balancer 130 may continue to forward the data packets received from the IoT device 140 to the first physical host 110 as long as a throughput of the data packets is below a defined threshold. For example, when the IoT device 140 is transmitting keep alive messages to the load balancer 130 for forwarding to the first physical host 110, the throughput associated with the keep alive messages may be below the defined threshold.

However, when the load balancer 130 detects that a throughput of the data packets received from the IoT device 140 exceeds the defined threshold (e.g., the IoT device 140 sends sensor data to the load balancer 130 for forwarding to the first physical host 110), then the load balancer may initiate a connection migration procedure to migrate the connection for the IoT device 140 from the first physical host 110 to a second physical host 120. The first physical host 110 may be configured to handle connections with reduced throughput, whereas the second physical host 120 may be configured to handle connections with increased throughput. In other words, the second physical host 120 may be configured to handle data packets of an increased throughput from the IoT device 140 with improved efficiency as compared to the first physical host 110.

In one example, the load balancer 130 may perform the connection migration procedure using a session initiation protocol (SIP) or a similar connection migration technique. After the connection migration procedure is completed, the second physical host 120 may take over the connection with the IoT device 140 and the load balancer 130 may forward data packets received from the IoT device 140 (with a throughput that exceeds the defined threshold) to the second physical host 120.

As a non-limiting example, the IoT device 140 may be connected to the first physical host 110 via the load balancer 130. The IoT device 140 may periodically send keep alive messages to the first physical host 110 to maintain the connection between the IoT device 140 and the first physical host 110. However, three times a day, the IoT device 140 may be configured to transmit aggregated sensor information. The load balancer 130 may detect when the IoT device 140 begins transmitting the aggregated sensor information at a throughput that exceeds the defined threshold, and the load balancer 130 may transfer the connection such that the second physical host 120 takes over the connection with the IoT device 140. The second physical host 120 may be configured to handle data (e.g., the aggregated sensor information) at an increased throughput from the IoT device 140. After the IoT device 140 finishes transmitting the aggregated sensor information and resumes the periodic transmissions of the keep alive messages at a throughput that is below the defined threshold, the load balancer 130 may migrate the connection for the IoT device 140 back to the first physical host 110.

In one example, the load balancer 130 may be a device that distributes network traffic across a number of physical hosts, physical servers, or virtual servers. For example, the load balancer 130 may receive traffic from the IoT device 140, and forward the traffic to a selected physical host or server. The load balancer 130 may decrease the burden on physical hosts or servers associated with managing and maintaining sessions and/or connections with the IoT devices 140. In addition, the load balancer 130 may improve the usage of resources, maximize throughput, minimize response time and avoid a single physical host or server from being overloaded. In one example, the IoT device 140 may include a computing device that is assigned a unique identifier, such as an Internet Protocol version 6 (IPv6) address, an IPv4 address, a uniform resource identifier (URI), or a global unique identifier. The IoT device 140 may capture information, and then securely communicate the information over a network to a physical host or server via the load balancer 130.

In one example, physical hosts in the computing service environment may also be referred to as device gateways. The physical hosts may be servers that maintain TCP connections with IoT devices. The physical hosts may be running computing instances used to host or maintain the TCP connections with the IoT devices. In the present technology, each physical host may include a port with a 16 bit value, which results in a theoretical maximum of 65,535 available ports per physical host (per tuple). In one example, the computing instances utilized for the physical hosts may permit four network interfaces to be attached and 16 Internet Protocol (IP) addresses per network interface, thereby resulting in 64 IP address per port. Therefore, 64 IP addresses per port multiplied by approximately 50,000 ports per IP address results in approximately 3.2 million possible TCP connections per physical host. In other words, each physical host in the computing service environment may potentially support connections for up to 3.2 million IoT devices.

In one example, the amount of memory to support 3.2 million IoT devices may depend on a buffer size allocated to each TCP connection, and the amount of memory for a TCP connection may be limited by an aggregate throughput of the combined TCP connections. In other words, a physical host may handle a relatively high number of TCP connections as long as each TCP connection is associated with a relatively low throughput. In one example, IoT devices may spend a majority of the time sending periodic keep alive messages to maintain an active connection, which results in a relatively low throughput for the IoT devices. Therefore, a physical host may be connected to a relatively large number of IoT devices as long as the IoT devices are limited to sending the periodic keep alive messages to the physical host. However, a physical host may only be able to maintain connections with a relatively small number of IoT devices when the IoT devices are sending data packets with an increased throughput (e.g., non-keep alive messages). When the physical host is configured to balance between a relatively high throughput per TCP connection and a relatively high number of TCP connections, the physical host may not be fully utilized and increased costs may result from the operation of the physical host.

Figure 2:
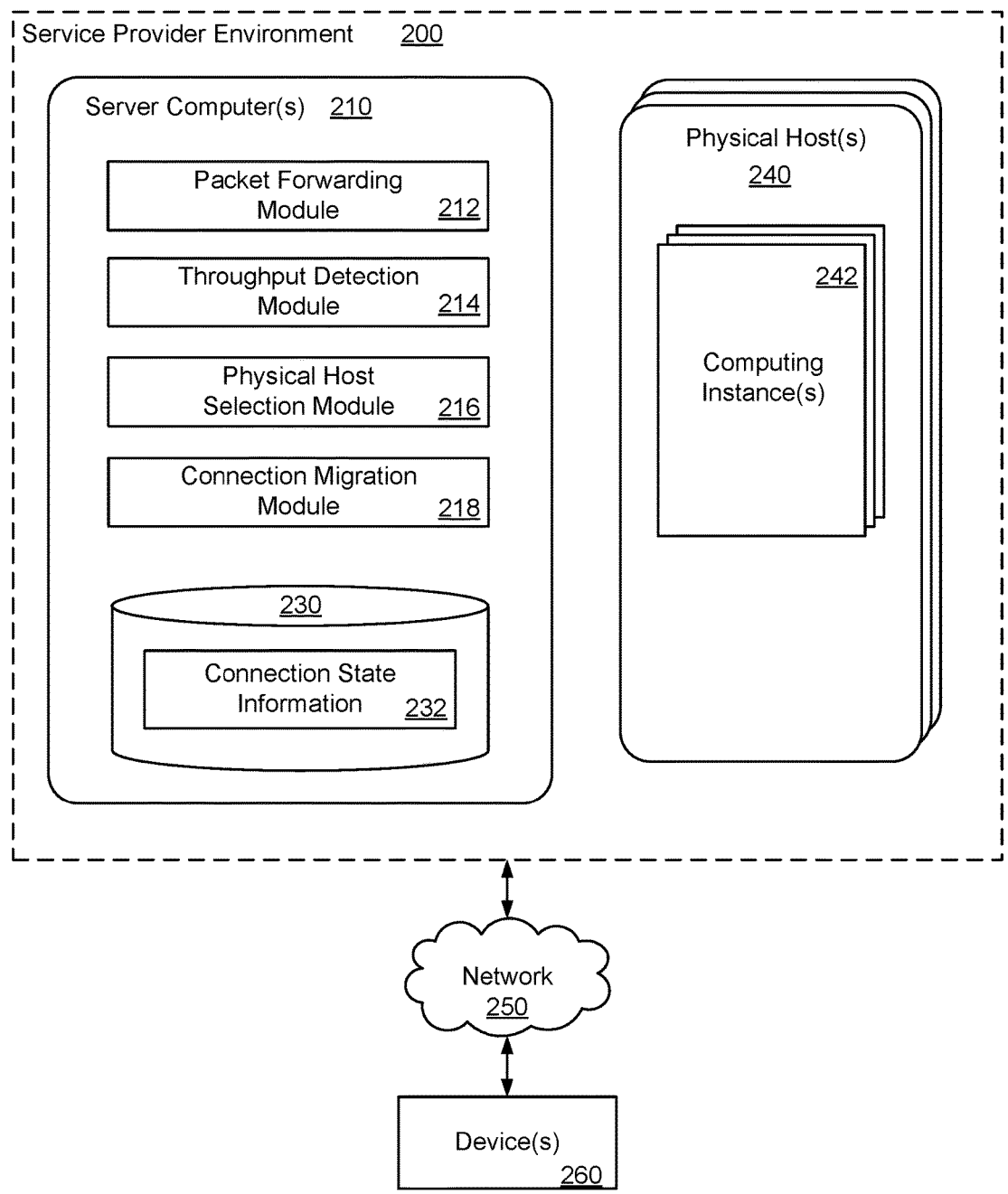
FIG. 2 is an illustration of a networked system for migrating a connection for an Internet of Things (IoT) device according to an example of the present technology.

FIG. 2 illustrates components of an example service provider environment 200 according to one example of the present technology. The service provider environment 200 may include a server computer 210, which in one example, may be a load balancer. The server computer 210 may be in communication with a number of devices 260 via a network 250. The devices 260 may include Internet of Things (IoT) devices. The server computer 210 may contain a data store 230 and a number of modules for migrating connections for the devices 260 between physical hosts 240 within the service provider environment 200. The physical hosts 240 may be running computing instances 242. In one example, the physical hosts 240 may be each optimized to handle specific configurations in terms of a number of connections for the devices 260, a level of throughput per device 260, etc. For example, the physical hosts 240 may include a first physical host that is configured to handle an increased number of connections for the devices 260 and a reduced throughput per connection. As another example, the physical hosts 240 may include a second physical host that is configured to handle a reduced number of connections for the devices 260 and an increased throughput per connection. The physical hosts 240 may communicate using a virtual network that is an overlay on an actual computing service network.

The data stored in the data store 230 may include connection state information 232. The connection state information 232 may include various parameters (e.g., TCP connection parameters) that describe or characterize the connections between the devices 260 (e.g., IoT devices) and the physical hosts 240. The connections state information 232 may be extracted from keep alive messages (or ping messages) or other messages that are periodically transmitted by the devices 260. The data store 230 that includes the connection state information 232 may be external to the physical hosts 240 that maintain the connections with the devices 260.

The server computer 210 may include a packet forwarding module 212, a throughput detection module 214, a physical host selection module 216, a connection migration module 218, and other applications, services, processes, systems, engines, or functionality not discussed in detail herein. In one example, the server computer 210 may be a load balancer in the service provider environment 200. The packet forwarding module 212 may be configured to forward data packets received from the device 260 (e.g., the IoT device) to one of the physical hosts 240 in the service provider environment 200. The packet forwarding module 212 may include forwarding information for the device 260, so that data packets received from the device 260 may be forwarded to a particular physical host 240 (e.g., a first physical host). In one example, the data packets may include keep alive messages to maintain an active connection between the devices 260 and the physical hosts 240. Alternatively, the data packets received from the devices 260 for forwarding to the physical hosts 240 may be related to a variety of areas, such as security (e.g., surveillance systems, driver security), tracking and tracing (e.g., asset tracking, navigation, traffic information, road tolling), payment (e.g., vending machines, gaming machines), health (e.g., monitoring vital signs, supporting the elderly or handicapped), remote maintenance/control (e.g., sensors, lighting, vehicle diagnostics), metering (e.g., power, gas, water, heating), and/or consumer devices (e.g., digital cameras).

The throughput detection module 214 may be configured to detect that a throughput of the data packets received from the device 260 for forwarding to a physical host 240 (e.g., a first physical host) is above a defined threshold. In one example, when the data packets include a keep alive message, the throughput detection module 214 may determine that the throughput of the keep alive message does not exceed the defined threshold. However, when the data packets include sensor data or other types of IoT data, the throughput detection module 214 may detect that the throughput of the data packets exceeds the defined threshold. In other words, a number of bytes (or bits) per second of data transfer from the device 260 may exceed the defined threshold. In addition, the throughput detection module 214 may detect when the throughput of the data packets is increasing at a rate that exceeds a defined threshold. As an example, the device 260 may be initially sending periodic keep alive messages, and then the device 260 may begin sending sensor data. The throughput detection module 214 may detect that the increase in throughput when the device 260 begins to transmit the sensor data is above a defined threshold.

The physical host selection module 216 may be configured to select a physical host 240 (e.g., a second physical host) to take over the connection with the device 260 when the throughput of the data packets from the device 260 exceeds the defined threshold. The physical host selection module 216 may select the physical host 240 (e.g., the second physical host) based on a present load at the physical host 240 in relation to other physical hosts in the service provider environment 200. As an example, between two physical hosts that are at 51% load capacity and 50% load capacity, respectively, the physical host selection module 216 may select the physical host at 50% load capacity to take over the connection with the device 260. As another example, the physical host selection module 216 may select the physical host 240 based on a round robin technique, such that the same physical host 240 may not take over connections for multiple devices 260 simultaneously. As yet another example, the physical host selection module 216 may select the physical host 240 based on a type of data packets (e.g., video packets) received from the device 260. In addition, the physical host selection module 216 may verify that the selected physical host 240 is configured to handle the throughput of the device 260.

The connection migration module 218 may be configured to initiate a connection migration procedure to migrate the connection (e.g., a TCP connection) for the device 260 between physical hosts 240 in the service provider environment 200. For example, the connection migration module 218 may utilize a session initiation protocol (SIP) to migrate the connection for the device 260 from a first physical host to a second physical host. The connection migration module 218 may exchange session state information for the device 260 from the first physical host to the second physical host. The session state information may include a current TCP package sequence number being transmitted, a location in a current TCP window, and various other TCP parameters to transfer the connection for the device 260 from the first physical host to the second physical host. Therefore, the connection migration module 218 may exchange various types of information with the two physical hosts 240 to transfer the connection from the first physical host to the second physical host.

In one configuration, after completion of the connection migration procedure, the packet forwarding module 212 may forward subsequent data packets received from the device 260 (e.g., the IoT device) to the physical host 240 that takes over the connection for the device 260 (e.g., the second physical host). The subsequent data packets received from the device 260 may include sensor data or other types of IoT data having a throughput that exceeds the defined threshold.

The device 260 may comprise, for example a processor-based system such as a computing system. More specifically, the device 260 may be an Internet of Things (IoT) device. As non-limiting examples, the device 260 may include consumer products (e.g., rice cookers, printers, or scanners), home automation products (e.g., smart thermostats, smart refrigerators, heating, air conditioning, etc.), manufacturing devices, sensors, drones, or other devices that are assigned unique identifiers and are capable of communicating data over the network 250. Commercial devices may also be included in the definition of the device 260, including: commercial printing presses, commercial freezers, commercial kilns, commercial mixers or other commercial equipment.

Alternatively, the device 260 may comprise a computer system that is embodied in the form of a desktop computer, a laptop computer, mobile devices, personal digital assistants, cellular telephones, smartphones, set-top boxes, network-enabled televisions, music players, tablet computer systems, game consoles, electronic book readers, or other devices with like capability.

The various processes and/or other functionality contained within the service provider environment 200 may be executed on one or more processors that are in communication with one or more memory modules. The service provider environment 200 may include a number of computing devices that are arranged, for example, in one or more server banks or computer banks or other arrangements. The computing devices may support a computing environment using hypervisors, virtual machine managers (VMMs) and other virtualization software.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

The network 250 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
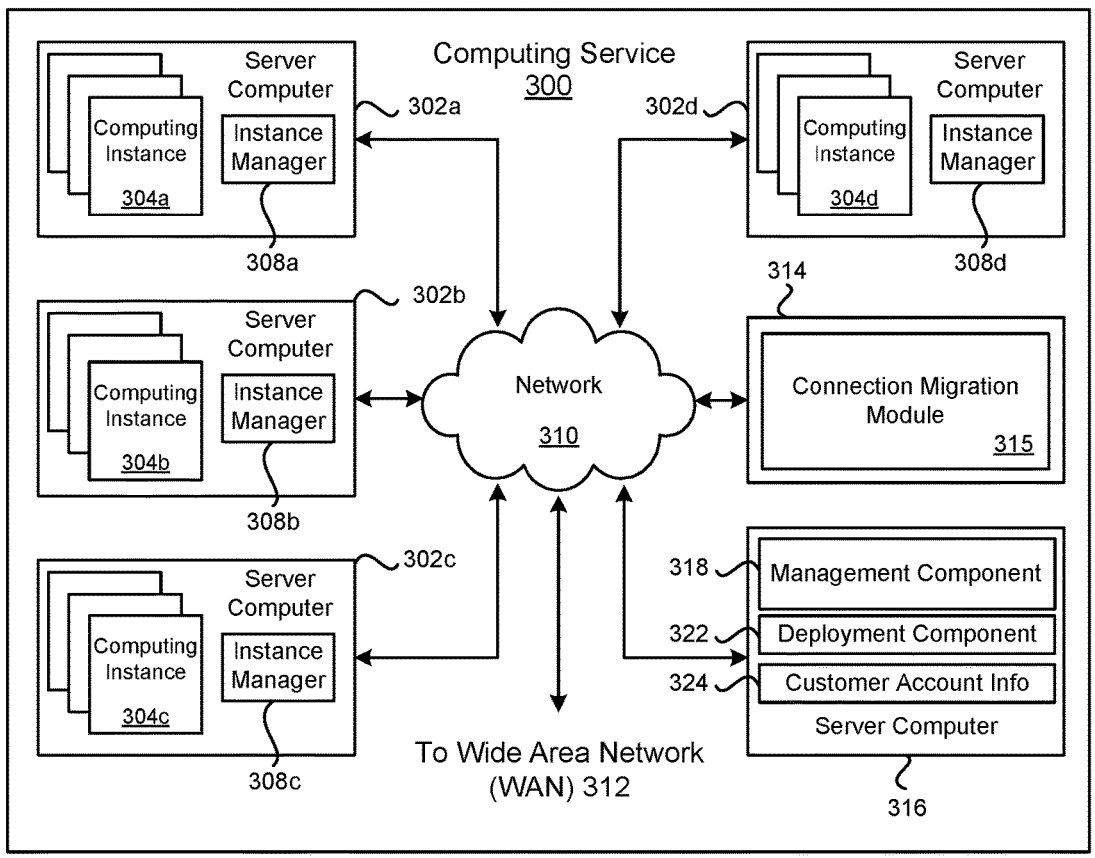
FIG. 3 is a block diagram of a computing service environment according to an example of the present technology.

FIG. 3 is a block diagram illustrating an example computing service 300 that may be used to execute and manage a number of computing instances 304a-d upon which the present technology may execute. In particular, the computing service 300 depicted illustrates one environment in which the technology described herein may be used. The computing service 300 may be one type of environment that includes various virtualized service resources that may be used, for instance, to host computing instances 304a-d.

The computing service 300 may be capable of delivery of computing, storage and networking capacity as a software service to a community of end recipients. In one example, the computing service 300 may be established for an organization by or on behalf of the organization. That is, the computing service 300 may offer a "private cloud environment." In another example, the computing service 300 may support a multi-tenant environment, wherein a plurality of customers may operate independently (i.e., a public cloud environment). Generally speaking, the computing service 300 may provide the following models: Infrastructure as a Service ("IaaS"), Platform as a Service ("PaaS"), and/or Software as a Service ("SaaS"). Other models may be provided. For the IaaS model, the computing service 300 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 300. End customers may access the computing service 300 using networked client devices, such as desktop computers, laptops, tablets, smartphones, etc. running web browsers or other lightweight client applications, for example. Those familiar with the art will recognize that the computing service 300 may be described as a "cloud" environment.

The particularly illustrated computing service 300 may include a plurality of server computers 302a-d. The server computers 302a-d may also be known as physical hosts. While four server computers are shown, any number may be used, and large data centers may include thousands of server computers. The computing service 300 may provide computing resources for executing computing instances 304a-d. Computing instances 304a-d may, for example, be virtual machines. A virtual machine may be an instance of a software implementation of a machine (i.e. a computer) that executes applications like a physical machine. In the example of a virtual machine, each of the server computers 302a-d may be configured to execute an instance manager 308a-d capable of executing the instances. The instance manager 308a-d may be a hypervisor, virtual machine manager (VMM), or another type of program configured to enable the execution of multiple computing instances 304a-d on a single server. Additionally, each of the computing instances 304a-d may be configured to execute one or more applications.

A server 314 may be reserved to execute software components for implementing the present technology or managing the operation of the computing service 300 and the computing instances 304a-d. For example, the server computer 314 may be a load balancer that executes a connection migration module 315. The load balancer may, via the connection migration module 315, migrate a connection for an Internet of Things (IoT) device between the server computers 302a-d (or physical hosts) in the computing service 300. For example, the load balancer may receive data packets from the IoT device for forwarding to a first server computer 302a in the computing service 300. The IoT device may communicate with the first server computer 302a using the connection between the IoT device and the first server computer 302a. The load balancer may detect that a throughput of the data packets from the IoT device for the first server computer 302a is above a defined threshold. The load balancer may then select a second server computer 302b in the computing service 300 to take over the connection with the IoT device. The load balancer may initiate a connection migration procedure to migrate the connection for the IoT device from the first server computer 302a to the second server computer 302b, such that subsequent data packets received from the IoT device may be forwarded by the load balancer to the second server computer 302b.

A server computer 316 may execute a management component 318. A customer may access the management component 318 to configure various aspects of the operation of the computing instances 304a-d purchased by a customer. For example, the customer may setup computing instances 304a-d and make changes to the configuration of the computing instances 304a-d.

A deployment component 322 may be used to assist customers in the deployment of computing instances 304a-d. The deployment component 322 may have access to account information associated with the computing instances 304a-d, such as the name of an owner of the account, credit card information, country of the owner, etc. The deployment component 322 may receive a configuration from a customer that includes data describing how computing instances 304a-d may be configured. For example, the configuration may include an operating system, provide one or more applications to be installed in computing instances 304a-d, provide scripts and/or other types of code to be executed for configuring computing instances 304a-d, provide cache logic specifying how an application cache is to be prepared, and other types of information. The deployment component 322 may utilize the customer-provided configuration and cache logic to configure, prime, and launch computing instances 304a-d. The configuration, cache logic, and other information may be specified by a customer accessing the management component 318 or by providing this information directly to the deployment component 322.

Customer account information 324 may include any desired information associated with a customer of the multi-tenant environment. For example, the customer account information may include a unique identifier for a customer, a customer address, billing information, licensing information, customization parameters for launching instances, scheduling information, etc. As described above, the customer account information 324 may also include security information used in encryption of asynchronous responses to API requests. By "asynchronous" it is meant that the API response may be made at any time after the initial request and with a different network connection.

A network 310 may be utilized to interconnect the computing service 300 and the server computers 302a-d, 316. The network 310 may be a local area network (LAN) and may be connected to a Wide Area Network (WAN) 312 or the Internet, so that end customers may access the computing service 300. In addition, the network 310 may include a virtual network overlaid on the physical network to provide communications between the servers 302a-d. The network topology illustrated in FIG. 3 has been simplified, as many more networks and networking devices may be utilized to interconnect the various computing systems disclosed herein.

Figure 4A:
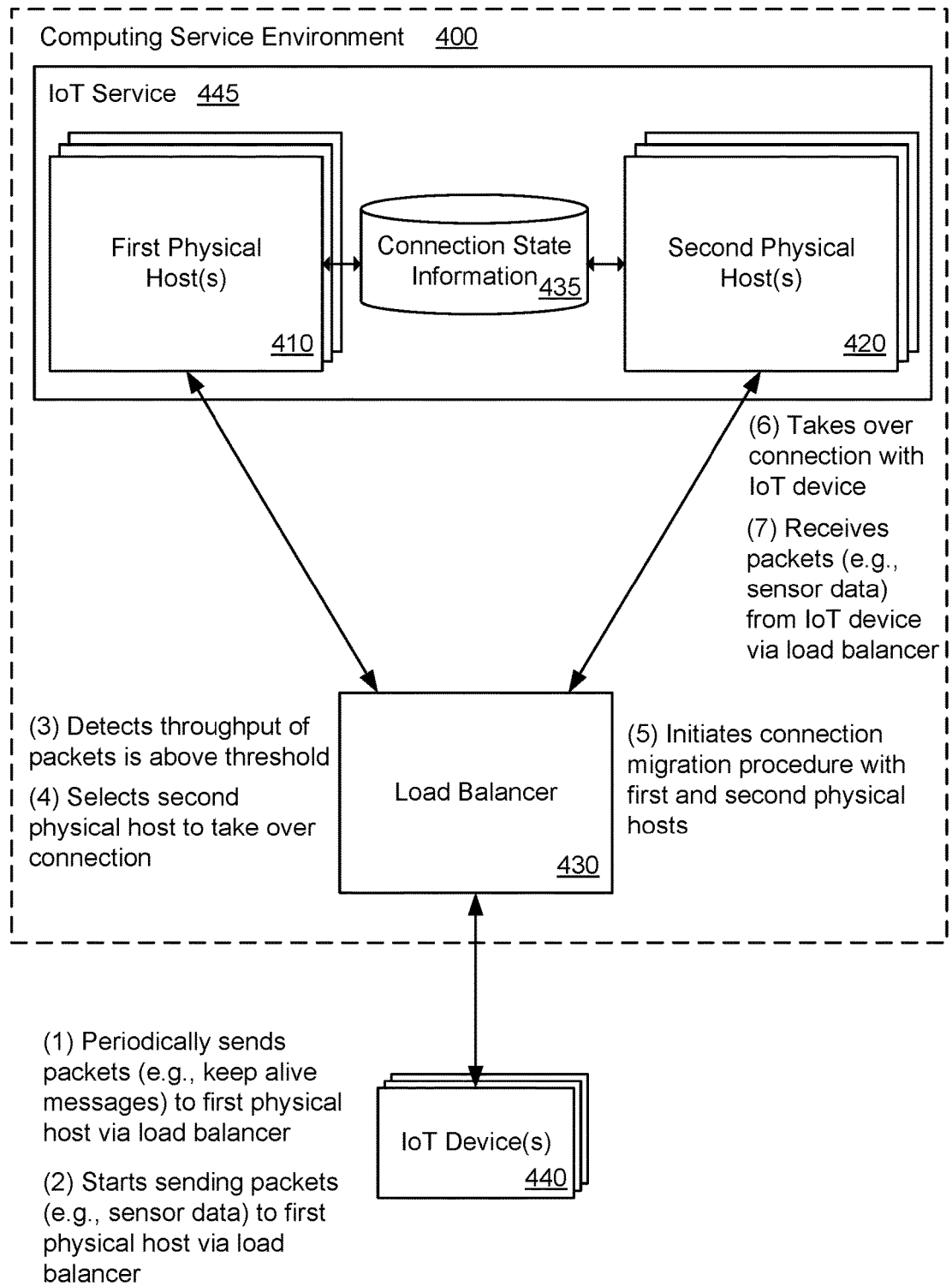
FIG. 4A illustrates a system and related operations for migrating a connection for an Internet of Things (IoT) device from a first physical host to a second physical host using a load balancer according to an example of the present technology.

FIG. 4A illustrates an exemplary system and related operations for migrating a connection for an Internet of Things (IoT) device 440 from a first physical host 410 to a second physical host 420 using a load balancer 430 and based on a throughput of the IoT device 440. The first physical host 410, the second physical host 420, and the load balancer 430 may be included in a computing service environment 400. The first physical host 410 and the second physical host 420 may be part of an IoT service 445 that operates in the computing service environment 400. The IoT device 440 may have a connection, such as a transmission control protocol (TCP) connection, with the first physical host 410. The connection between the first physical host 410 and the IoT device 440 may be maintained by the first physical host 410. The IoT device 440 may communicate data packets to the first physical host 410 via the load balancer 430, as shown in step 1. For example, the IoT device 440 may periodically send keep alive messages (or ping messages) to the first physical host 410 in order to maintain an active connection with the first physical host 410. As non-limiting examples, the IoT device 440 may transmit the keep alive messages every 15 minutes, 30 minutes, one hour or two hours. The keep alive messages may be a relatively small amount of data transmitted from the IoT device 440 to the first physical host 410.

In one configuration, the first physical host 410 may be configured to handle an increased number of connections for IoT devices 440 and a reduced throughput per connection. In other words, the first physical host 410 may be configured to support a relatively large number of connections with IoT devices 440, as long as the IoT devices 440 transmit a relatively small amount of data (e.g., keep alive messages). However, when the IoT devices 440 transmit data packets at a throughput that exceeds a defined threshold (e.g., data packets that are not keep alive messages), the first physical host 410 may be unable to handle the relatively large number of connections.

In one example, the IoT device 440 may begin transmitting data packets to the first physical host 410 that are not keep alive messages, as shown in step 2. As an example, the IoT device 440 may begin transmitting sensor data to the first physical host 410 in accordance with a daily schedule in which the IoT device 440 transmits sensor data three times a day. The IoT device 440 may transmit the data packets to the load balancer 430 for forwarding to the first physical host 410.

In one example, the load balancer 430 may receive the data packets (e.g., sensor data) from the IoT device 440, and the load balancer 430 may detect that a throughput of the data packets exceeds a defined threshold, as shown in step 3. Based on the throughput, the load balancer 430 may infer that the data packets received from the IoT device 440 are not keep alive messages. In addition, the load balancer 430 may detect when the throughput of the data packets from the IoT device 440 is increasing at a rate that exceeds a defined threshold. For example, the increase in throughput when the IoT device 440 transitions from sending keep alive messages to sending sensor data may exceed the defined threshold.

When the throughput of the data packets from the IoT device 440 is increasing and/or is above the defined threshold, and when the first physical host 410 is not configured to handle connections with a relatively high throughput, the load balancer may select the second physical host 420 to take over the connection with the IoT device 440, as shown in step 4. In other words, the connection for the IoT device 440 may be migrated from the first physical host 410 to the second physical host 420. The second physical host 420 may be configured to handle a decreased number of connections for IoT devices 440, but an increased throughput per connection. In other words, although the second physical host 420 may support a relatively small number of connections with IoT devices 440 as compared to the first physical host 410, the second physical host 420 may handle data packets (e.g., sensor data) from the IoT device 440 at a throughput that exceeds the defined threshold.

In one example, the load balancer 430 may select the second physical host 420 to take over the connection for the IoT device 440 based on a present load at the second physical host 420 in relation to other physical hosts in the computing service environment 400. As an example, between a group of potential physical hosts to take over the connection for the IoT device 440, the load balancer 430 may select a physical host (e.g., the second physical host 420) that currently has a lowest load as compared to the other physical hosts in the group. In another example, the load balancer 430 may select a physical host (e.g., the second physical host 420) that currently has a lowest number of active connections as compared to the other physical hosts in the group of potential physical hosts to take over the connection for the IoT device 440. In yet another example, the load balancer 430 may select the second physical host 420 based on a round robin technique, such that the same physical host may not take over connections for multiple IoT devices simultaneously. As a non-limiting example, in accordance with the round robin technique, the load balancer 430 may migrate connections for ten IoT devices to physical hosts 1 through 10, and connections for another ten IoT devices may be migrated to the physical hosts 1 through 10 (in the same order).

In one example, when selecting the second physical host 420, the load balancer 430 may consider a predicted traffic pattern (or expected traffic pattern) of the IoT device 440 in relation to predicted traffic patterns for other IoT devices that are currently connected to the first physical host 410, such that the second physical host 420 does not take over connections for multiple IoT devices simultaneously. As an example, based on the predicted traffic patterns, the load balancer 430 may determine that ten IoT devices that are currently connected to the first physical host 410 are scheduled to all transmit sensor data at substantially the same time. Therefore, the load balancer may migrate connections for a first portion of the ten IoT devices to the second physical host 420, and the load balancer may migrate connections for a second portion of the ten IoT devices to a third physical host (now shown). As a result, based on knowledge of the predicted traffic patterns, the load balancer 430 may spread the migration of the connections to multiple physical hosts. The load balancer 430 may not migrate a relatively large number of connections from the first physical host 410 to the second physical host 420 at the same time, which may prevent the second physical host 420 from being overloaded.

In one configuration, the load balancer 430 may initiate a connection migration procedure with the first physical host 410 and the second physical host 420 to migrate the connection for the IoT device 440 from the first physical host 410 to the second physical host 420, as in step 5. In one example, the load balancer 430 may use a session initiation protocol (SIP) to perform the connection migration from the first physical host 410 to the second physical host 420. In another example, the load balancer 430 may exchange session state information for the IoT device 440 from the first physical host 410 to the second physical host 420. The session state information may include a current TCP package sequence number being transmitted, a location in a current TCP window, and various other TCP parameters to transfer the connection for the IoT device 440 from the first physical host 410 to the second physical host 420. In addition, the connection migration may be transparent to the IoT device 440. In other words, the IoT device 440 may not know that a connection migration is occurring from the first physical host 410 to the second physical host 420.

In one example, after the connection migration procedure is completed, the second physical host 420 may take over the connection with the IoT device 440, as in step 6. In other words, the IoT device 440 may communicate with the second physical host 420 via the load balancer 430, as opposed to the first physical host 410. Therefore, subsequent data packets (e.g., sensor data) received at the load balancer 430 from the IoT device 440 may be forwarded from the load balancer 430 to the second physical host 420, as in step 7. Since the throughput of the subsequent data packets may exceed the defined threshold, the second physical host 420 may be configured to handle the data packets more efficiently and with reduced operating costs as compared to the first physical host 410.

In one configuration, the first physical host 410 or the second physical host 420 may extract connection state information 435 from the keep alive messages (or ping messages) received from the IoT device 440, and the connection state information may be stored in an external memory device that is separate from the first physical host 410 or the second physical host 420. The connection state information 435 may include various parameters (e.g., TCP connection parameters) that describe or characterize the connection between the IoT device 440 and the first physical host 410 or the second physical host 420. By storing the connection state information 435 external to the first physical host 410 or the second physical host 420, as opposed to storing the connection state information 435 in a local memory, the first physical host 410 or the second physical host 420 may support an increased number of connections with IoT devices 440. In other words, the number of connections supported at the first physical host 410 or the second physical host 420 may not be limited based on a size of the local memory. In addition, the connection state information 435 may pass from the first physical host 410 to the second physical host 420 when the connection for the IoT device 440 is migrated from the first physical host 410 to the second physical host 420.

In one configuration, a periodicity of the keep alive messages transmitted from the IoT device 440 to the first physical host 410 or the second physical host 420 via the load balancer 430 may depend on a network configuration. For example, based on the network configuration (e.g., the configuration of routers, firewalls and other network entities), the IoT device 440 may transmit the keep alive messages approximately every 15 minutes, 30 minutes, one hour, two hours, etc. in order to maintain an active connection with the first physical host 410 or the second physical host 420. In one example, the load balancer 430 may analyze a network configuration associated with the IoT device 440, and based on the network configuration, the load balancer 440 may generate for the IoT device 440 a recommended periodicity for transmitting the keep alive messages. The recommended periodicity may be transmitted from the load balancer 430 to the IoT device 440, and the IoT device 440 may periodically transmit keep alive messages based on the recommended periodicity. As a result, the IoT device 440 may transmit the keep alive messages at a reduced frequently, while still maintaining the active connection with the first physical host 410 or the second physical host 420.

Figure 4B:
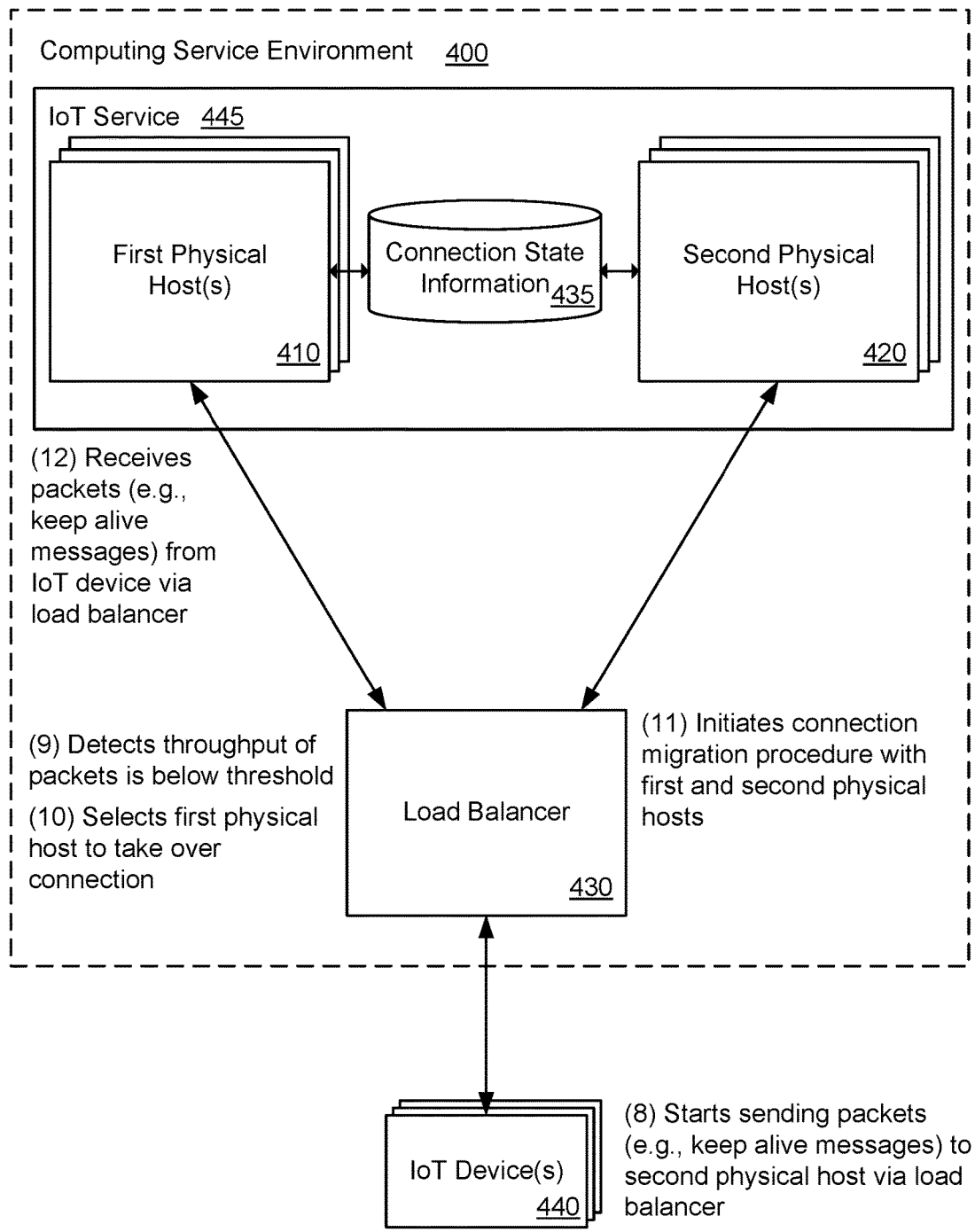
FIG. 4B illustrates a system and related operations for migrating a connection for an Internet of Things (IoT) device from a second physical host to a first physical host using a load balancer according to an example of the present technology.

FIG. 4B illustrates an exemplary system and related operations for migrating a connection for an Internet of Things (IoT) device 440 from a second physical host 420 to a first physical host 410 using a load balancer 430 and based on a throughput of the IoT device 440. In FIG. 4B, the connection for the IoT device 440 may be migrated from the second physical host 420 to the first physical host 410 when the throughput is relatively low, whereas in FIG. 4A, the connection for the IoT device may be migrated from the first physical host 410 to the first physical host 420 when the throughput is relatively high. The first physical host 410, the second physical host 420, and the load balancer 430 may be included in a computing service environment 400. The first physical host 410 and the second physical host 420 may be part of an IoT service 445 that operates in the computing service environment 400. The IoT device 440 may have a connection, such as a transmission control protocol (TCP) connection, with the second physical host 420. The connection between the second physical host 420 and the IoT device 440 may be maintained by the second physical host 420. The IoT device 440 may be configured to transmit data packets (e.g., sensor data) to the second physical host 420 via the load balancer 430, and a throughput of the data packets may exceed a defined threshold. The second physical host 420 may be configured to support a relatively small number of connections with IoT devices 440. However, the second physical host 420 may handle data packets (e.g., sensor data) from the IoT device 440 at a throughput that exceeds the defined threshold.

In one example, the IoT device 440 may begin sending data packets (e.g., keep alive messages) to the second physical host 420 via the load balancer 430, as in step 8. The load balancer 430 may receive the data packets from the IoT device 440 for forwarding to the second physical host 420, and the load balancer 430 may detect that a throughput of the data packets (e.g., the keep alive messages) is below the defined threshold, as in step 9. When the throughput of the data packets is below the defined threshold, the load balancer 430 may select the first physical host 410 to take over the connection with the IoT device 440, as in step 10. The first physical host 410 may be configured to support a relatively large number of connections with IoT devices 440, as long as the IoT devices 440 transmit a relatively small amount of data (e.g., keep alive messages). Therefore, when the IoT device 440 is sending data packets at a throughput that is below the defined threshold (e.g., keep alive messages), it may be more efficient and cost effective for the first physical host 410 to maintain the connection with the IoT device 440, as opposed to the second physical host 420 (which is configured to handle connections with a relatively high throughput).

In one example, the load balancer 430 may initiate a connection migration procedure with the first physical host 410 and the second physical host 420 to migrate the connection for the IoT device 440 from the second physical host 420 to the first physical host 410, as in step 11. In one example, the load balancer 430 may use a session initiation protocol (SIP) to perform the connection migration from the second physical host 420 to the first physical host 410. The load balancer 430 may exchange session state information for the IoT device 440 (e.g., a current TCP package sequence number being transmitted, a location in a current TCP window) from the second physical host 420 to the first physical host 410 to transfer the connection for the IoT device 440 from the second physical host 420 to the first physical host 410. Moreover, after the first physical host 410 takes over the connection with the IoT device 440, subsequent data packets (e.g., keep alive messages) received at the load balancer 430 from the IoT device 440 may be forwarded from the load balancer 430 to the first physical host 410, as in step 12. Since the throughput of the subsequent data packets may be below the defined threshold, the first physical host 410 may be configured to handle the data packets more efficiently and with reduced operating costs as compared to the second physical host 420.

Figure 5:
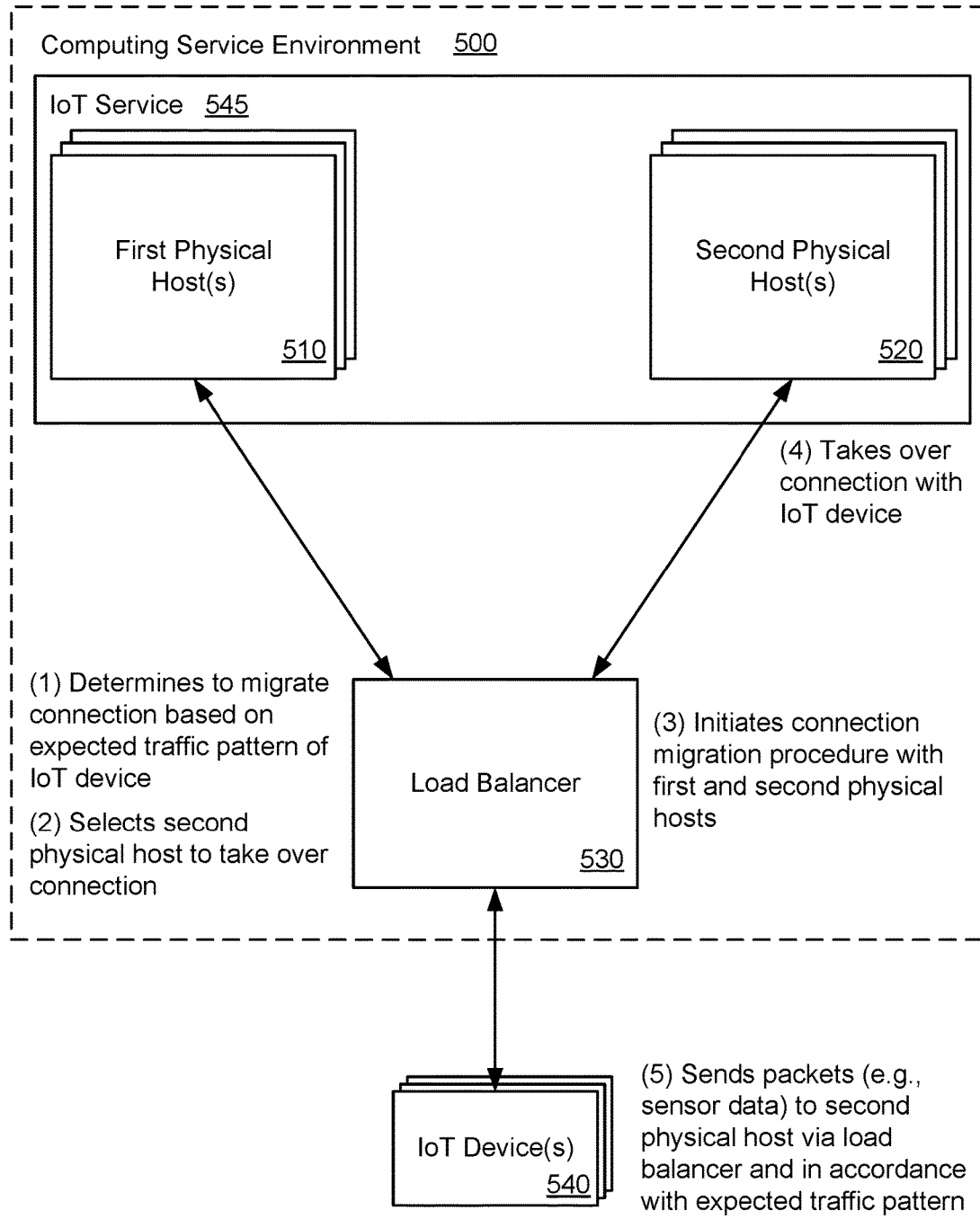
FIG. 5 illustrates a system and related operations for migrating a connection for an Internet of Things (IoT) device from a first physical host to a second physical host using a load balancer according to an example of the present technology.

FIG. 5 illustrates an exemplary system and related operations for migrating a connection for an Internet of Things (IoT) device 540 from a first physical host 510 to a second physical host 520 using a load balancer 530 and based on an expected traffic pattern of the IoT device 540. The first physical host 510, the second physical host 520, and the load balancer 430 may be included in a computing service environment 500. The first physical host 510 and the second physical host 520 may be part of an IoT service 545 that operates in the computing service environment 500. The IoT device 540 may have a connection, such as a transmission control protocol (TCP) connection, with the first physical host 510. The IoT device 540 may be configured to communicate data packets (e.g., keep alive messages) to the first physical host 510 via the load balancer 530. In one example, the first physical host 510 may be configured to support a relatively large number of connections with IoT devices 540, as long as the IoT devices 540 transmit a relatively small amount of data (e.g., keep alive messages) to the first physical host 510. Therefore, the data packets transmitted from the IoT device 540 to the first physical host 510 via the load balancer 530 may be at a throughput that is below a defined threshold. As an example, the throughput of the data packets transmitted from the IoT device 540 may be below the defined threshold when the data packets are keep alive messages.

In one configuration, the load balancer 530 may determine to migrate the connection for the IoT device 540 from the first physical host 510 to the second physical host 520 based on a predicted traffic pattern (or expected traffic pattern) of the IoT device 540, as in step 1. For example, the load balancer 530 may determine that the IoT device 540 is due to send data packets in the next one minute, and that a throughput for sending the data packets may exceed the defined threshold. The IoT device 540 may be configured to transmit aggregated sensor information four times a day in accordance with a predefined schedule. In one example, the load balancer 530 may be provided with the predefined schedule, and based on the predefined schedule, the load balancer 530 may determine when the IoT device 540 is about to send data packets at a throughput that exceeds the defined threshold. Alternatively, based on historical data packet transmissions from the IoT device 540 at a throughput that exceeds the defined threshold, the load balancer 530 may use machine learning or similar techniques to predict when the IoT device 540 is about to send data packets at a throughput that exceeds the defined threshold.

In one example, the load balancer 530 may select the second physical host 520 to take over the connection with the IoT device 540 based on the predicted traffic pattern, as shown in step 2. The second physical host 520 may be configured to handle a decreased number of connections for IoT devices 540 and an increased throughput per connection. In other words, although the second physical host 520 may support a relatively small number of connections with IoT devices 540 as compared to the first physical host 510, the second physical host 520 may handle data packets (e.g., sensor data) from the IoT device 540 at a throughput that exceeds the defined threshold. As an example, the load balancer 530 may select the second physical host 520 to take over the connection with the IoT device 540 based on a present load at the second physical host 520 in relation to other physical hosts in the computing service environment 500. As another example, the load balancer 530 may select the second physical host 520 based on a round robin technique, such that the same physical host may not take over connections for multiple IoT devices simultaneously.

In one configuration, the load balancer 530 may initiate a connection migration procedure with the first physical host 510 and the second physical host 520 to migrate the connection for the IoT device 540 from the first physical host 510 to the second physical host 520, as in step 3. In one example, the load balancer 530 may use a session initiation protocol (SIP) to perform the connection migration from the first physical host 510 to the second physical host 520.

In one example, after the connection migration procedure is completed, the second physical host 520 may take over the connection with the IoT device 540, as in step 4. Therefore, subsequent data packets (e.g., sensor data) received at the load balancer 530 from the IoT device 540 in accordance with the expected traffic pattern may be forwarded from the load balancer 530 to the second physical host 520, as in step 5. Since the throughput of the subsequent data packets may exceed the defined threshold, the second physical host 520 may be configured to handle the data packets more efficiently and with reduced operating costs as compared to the first physical host 510.

Figure 6:
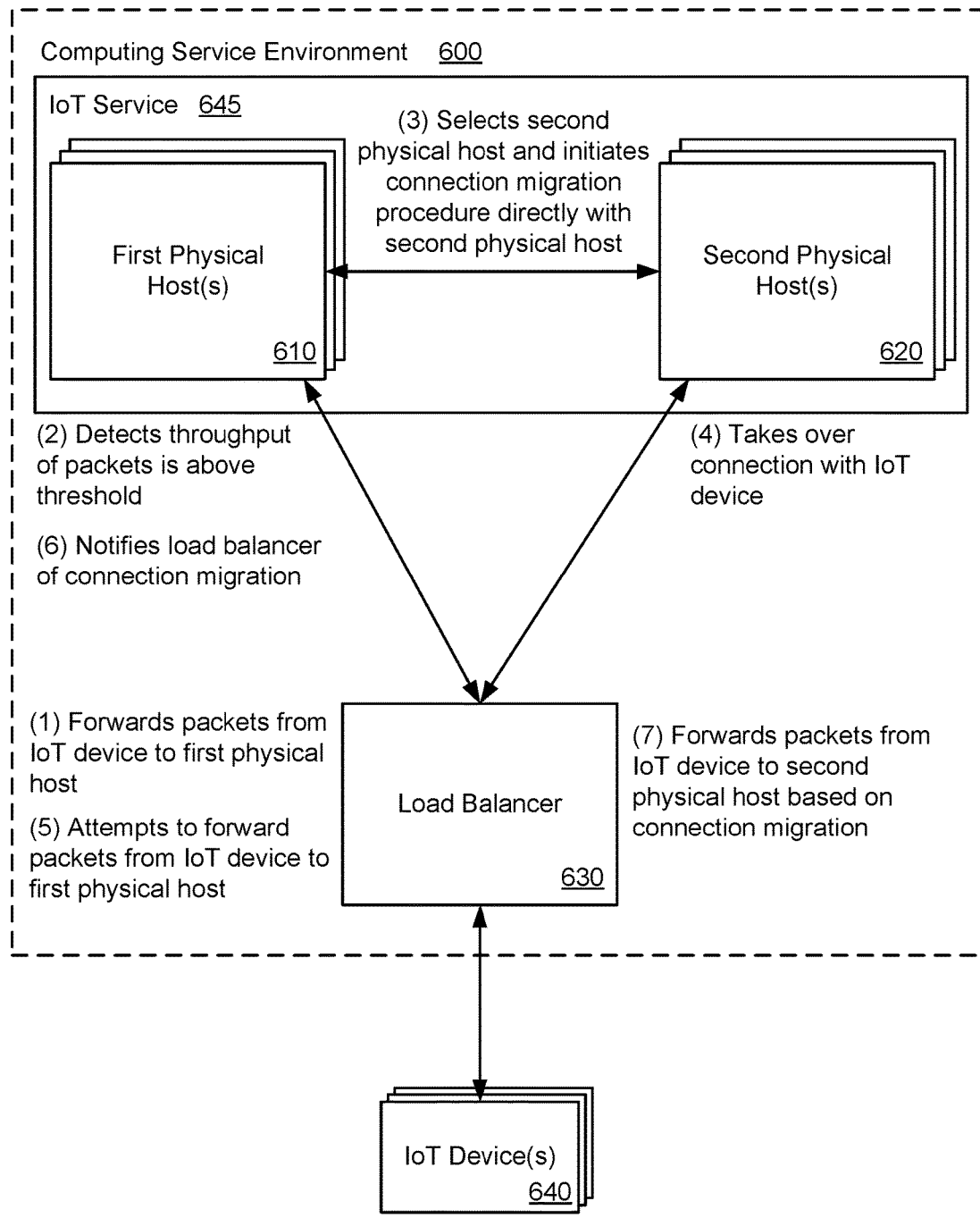
FIG. 6 illustrates a system and related operations for migrating a connection for an Internet of Things (IoT) device directly from a first physical host to a second physical host according to an example of the present technology.

FIG. 6 illustrates an exemplary system and related operations for migrating a connection for an Internet of Things (IoT) device 640 directly from a first physical host 610 to a second physical host 620. The first physical host 610, the second physical host 620, and a load balancer 630 may be included in a computing service environment 600. The first physical host 610 and the second physical host 620 may be part of an IoT service 645 that operates in the computing service environment 600. The IoT device 640 may have a connection, such as a transmission control protocol (TCP) connection, with the first physical host 610. The IoT device 640 may communicate data packets to the first physical host 610 via the load balancer 630, as shown in step 1. For example, the IoT device 640 may periodically send keep alive messages (or ping messages) to the first physical host 610 in order to maintain an active connection with the first physical host 610. In one example, the first physical host 610 may be configured to support a relatively large number of connections with IoT devices 640, as long as the IoT devices 640 transmit a relatively small amount of data (e.g., keep alive messages) to the first physical host 610.

In one example, the first physical host 610 may detect when a throughput of the data packets received from the IoT device 640 via the load balancer 630 exceeds a defined threshold, as shown in step 2. Based on the throughput, the first physical host 610 may infer that the data packets received from the IoT device 640 is sensor data or another type of IoT data, as opposed to keep alive messages.

In one example, the first physical host 610 may select the second physical host 620 to take over the connection with the IoT device 640, as shown in step 3. The second physical host 620 may be configured to support a relatively small number of connections with IoT devices 640 as compared to the first physical host 610, but the second physical host 620 may handle data packets (e.g., sensor data) from the IoT device 640 at a throughput that exceeds the defined threshold.

In one example, the first physical host 610 may randomly select the second physical host 620 to take over the connection with the IoT device 640. In this example, the first physical host 610 may inquire about the second physical host's current capacity (i.e., whether the second physical host 620 is able to take on additional connections with IoT devices). The second physical host 620 may receive the inquiry from the first physical host 610, and in response, the second physical host 620 may indicate whether the second physical host 620 is able to take over the connection with the IoT device 640. In one example, when the first physical host 610 receives an indication that the second physical host 620 cannot take over the connection with the IoT device 640, the first physical host 610 may randomly select a third physical host and inquire about the third physical host's ability to take over the connection with the IoT device 640, and so on.

In one example, the first physical host 610 may randomly select physical hosts to potentially take over the connection based on a hashing function. In another example, the first physical host 610 may receive information about a plurality of physical hosts in the computing service environment 600 in accordance with a gossip protocol. Based on the information received at the first physical host 610, the first physical host 610 may know which physical hosts in the computing service environment 600 are currently able (or not able) to take over IoT connections, and the first physical host 610 may use this information when selecting the second physical host 620 to take over the connection for the IoT device 640.

The first physical host 610 may initiate a connection migration procedure directly with the second physical host 620 to migrate the connection for the IoT device 640 from the first physical host 610 to the second physical host 620. In this configuration, the load balancer 630 does not initiate and perform the connection migration. In one example, the first physical host 610 may exchange session state information (e.g., a current TCP package sequence number being transmitted, a location in a current TCP window) with the second physical host 620 when transferring the connection for the IoT device 640 from the first physical host 610 to the second physical host 620. After completion of the connection migration procedure, the second physical host 620 may take over the connection with the IoT device 640, as shown in step 4.

In one configuration, the IoT device 640 may send subsequent data packets (e.g., sensor data) to the load balancer 630 for forwarding to the second physical host 620. However, the load balancer 630 may be unaware that the connection for the IoT device 640 migrated from the first physical host 610 to the second physical host 620. Therefore, the load balancer 630 may attempt to forward the data packets received from the IoT device 640 to the first physical host 610, as in step 5. The first physical host 610 may receive the data packets from the load balancer 630, and the first physical host 610 may notify the load balancer 630 of the connection migration for the IoT device 640 from the first physical host 610 to the second physical host 620, as in step 6. The notification transmitted from the first physical host 610 to the load balancer 630 may include forwarding information associated with the second physical host 620. After receiving the notification from the first physical host 610 indicating the connection migration of the IoT device 640, the load balancer 630 may forward the subsequent data packets (e.g., sensor data) received from the IoT device 640 to the second physical host 620.

In one example, after the second physical host 620 takes over the connection with the IoT device 640, the first physical host 610 or the second physical host 620 may notify the load balancer 630 that the connection for the IoT device 640 has migrated to the second physical host 620. Based on the notification, the load balancer 630 may forward subsequent packets received from the IoT device 640 to the second physical host 620.

Figure 7:
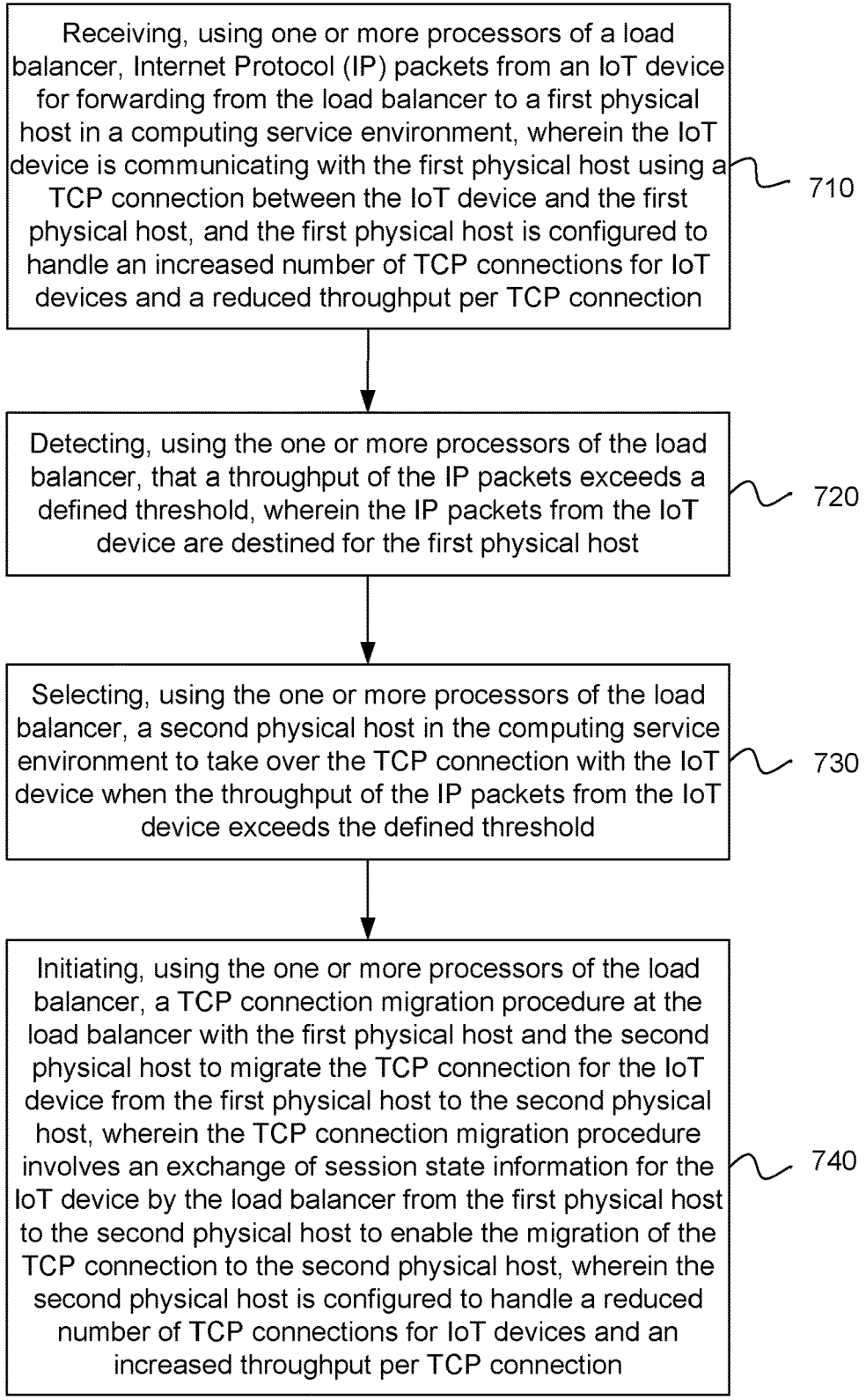
FIG. 7 is a flowchart of an example method for migrating transmission control protocol (TCP) connections for Internet of Things (IoT) devices.

FIG. 7 illustrates an example of a method for migrating transmission control protocol (TCP) connections for Internet of Things (IoT) devices. Internet Protocol (IP) packets may be received from an IoT device for forwarding to a first physical host in a computing service environment, as in block 710. More specifically, the IP packets may be received at a load balancer, and the load balancer may forward the IP packets to the first physical host. The IoT device may communicate with the first physical host via the load balancer using a TCP connection between the IoT device and the first physical host. The first physical host may be configured to handle an increased number of TCP connections for IoT devices and a reduced throughput per TCP connection.

A throughput of the IP packets from the IoT device for the first physical host may be detected as exceeding a defined threshold, as in block 720. For example, the IoT device may begin transmitting IP packets that include sensor data, which may be transmitted at a throughput that exceeds the defined threshold. However, the throughput of the IP packets from the IoT device may be detected as being below the defined threshold when the IoT device is periodically transmitting keep alive messages to the first physical host.

A second physical host in the computing service environment may be selected to take over the TCP connection with the IoT device when the throughput of the IP packets from the IoT device exceeds the defined threshold, as in block 730. For example, the second physical host may be selected by the load balancer based on: a present load at the second physical host in relation to present loads for a plurality of physical hosts in the computing service environment, or a predicted traffic pattern of the IoT device in relation to predicted traffic patterns for a plurality of IoT devices that are currently connected to the first physical host.

A TCP connection migration procedure may be initiated at the load balancer with the first physical host and the second physical host to migrate the TCP connection for the IoT device from the first physical host to the second physical host, as in block 740. The TCP connection migration procedure may include an exchange of session state information for the IoT device by the load balancer from the first physical host to the second physical host to enable the migration of the TCP connection to the second physical host. The second physical host may be configured to handle a reduced number of TCP connections for IoT devices and an increased throughput per TCP connection.

In one example, additional IP packets may be received from the IoT device. The additional IP packets may be forwarded to the second physical host in the computing service environment based on the migration of the TCP connection for the IoT device to the second physical host.

In one example, additional IP packets may be received from the IoT device for forwarding to the second physical host. A throughput of the additional IP packets from the IoT device for the second physical host may be detected as being below the defined threshold. A TCP connection migration procedure may be initiated to migrate the TCP connection for the IoT device from the second physical host to the first physical host.

Figure 8:
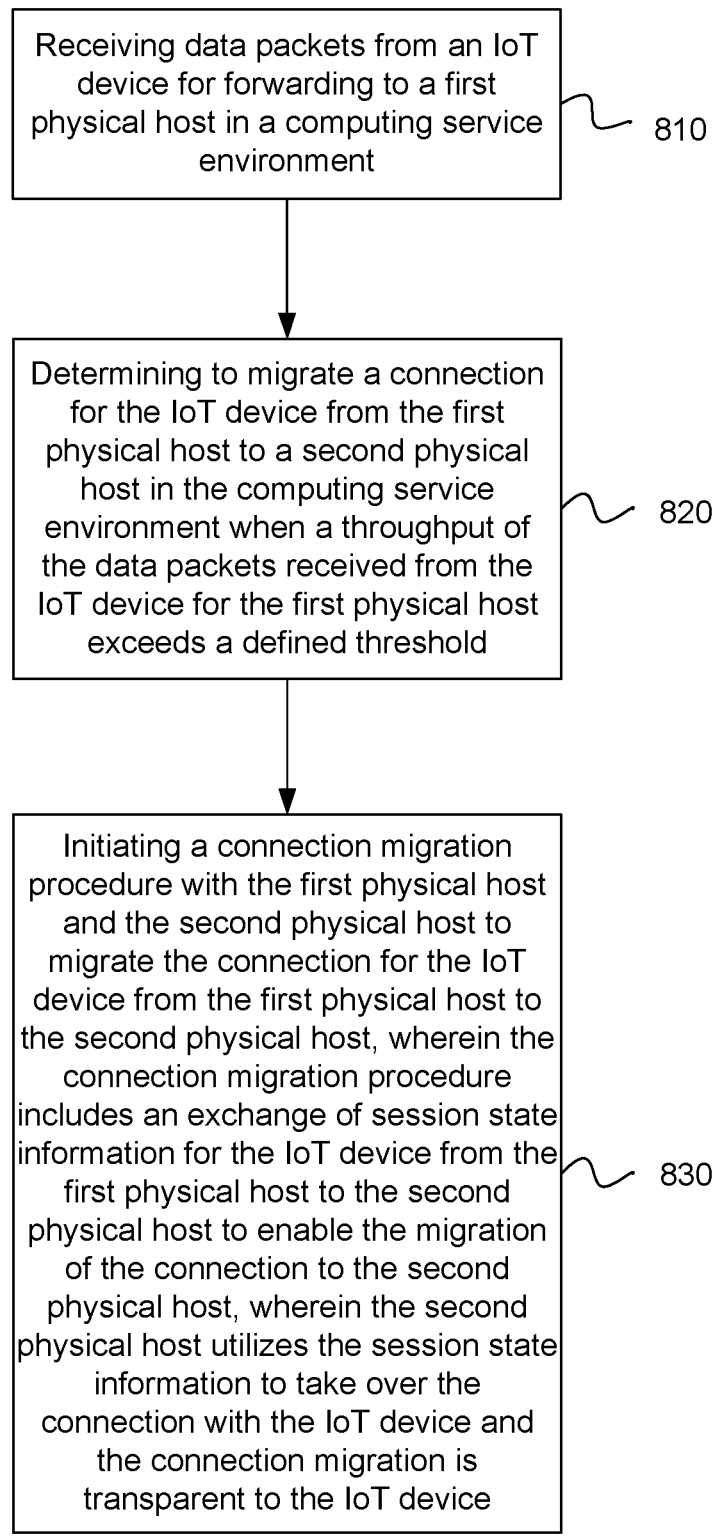
FIG. 8 is a flowchart of an example method for migrating connections for Internet of Things (IoT) devices.

FIG. 8 illustrates an example of a method for migrating connections for Internet of Things (IoT) devices. As an example, the connection may be a session-based connection protocol. As another example, the connection may be a transmission control protocol (TCP) connection. Data packets may be received from an IoT device for forwarding to a first physical host in a computing service environment, as in block 810. For example, the data packets may be received at a load balancer, and the load balancer may forward the data packets to the first physical host. The IoT device may communicate with the first physical host via the load balancer using a connection between the IoT device and the first physical host. The data packets may include keep alive messages, sensor data, etc.

A determination may be made to migrate a connection for the IoT device from the first physical host to a second physical host in the computing service environment when a throughput of the data packets received from the IoT device for the first physical host exceeds a defined threshold, as in block 820. In addition, the determination to migrate the connection for the IoT device to the second physical host may be made based on an expected traffic pattern of the IoT device. The second physical host may be configured to handle the expected traffic pattern of the IoT device with reduced operating costs as compared to the first physical host.

A connection migration procedure may be initiated with the first physical host and the second physical host to migrate the connection for the IoT device from the first physical host to the second physical host, as in block 830. The connection migration procedure may include an exchange of session state information for the IoT device from the first physical host to the second physical host to enable the migration of the connection to the second physical host, and the second physical host may utilize the session state information to take over the connection with the IoT device. The connection migration may be transparent to the IoT device. In other words, the IoT device may not know that a connection migration is occurring from the first physical host to the second physical host. In one example, the connection for the IoT device may be migrated from the first physical host to the second physical host using a load balancer in the computing service environment. In another example, the connection for the IoT device may be migrated from the first physical host to the second physical host using a session initiation protocol (SIP) at a load balancer. In addition, the first physical host may be configured to handle an increased number of connections for IoT devices and a reduced throughput per connection, and the second physical host may be configured to handle a reduced number of connections for IoT devices and an increased throughput per TCP connection.

In one example, data packets from the IoT device may be forwarded to the second physical host in accordance with the migration of the connection for a defined duration based on an expected traffic pattern of the IoT device or until a throughput of the data packets from the IoT device falls below the defined threshold. At that point, the connection for the IoT device may be migrated from the second physical host to the first physical host.

In one configuration, the second physical host in the computing service environment may be selected to take over the connection with the IoT device based on: a present load at the second physical host in relation to present loads for a plurality of physical hosts in the computing service environment; or a predicted traffic pattern of the IoT device in relation to predicted traffic patterns for a plurality of IoT devices that are currently connected to the first physical host. In another example, the second physical host in the computing service environment may be selected to take over the connection with the IoT device based on a type of IoT device or a type of data communicated from the IoT device.

In one example, connection state information may be extracted from the data packets received from the IoT device at the first physical host or the second physical host. The data packets may include keep alive messages. The connection state information may be transferred from a local memory of the first physical host or the second physical host to an external memory storage device in the computing service environment.

Figure 9:
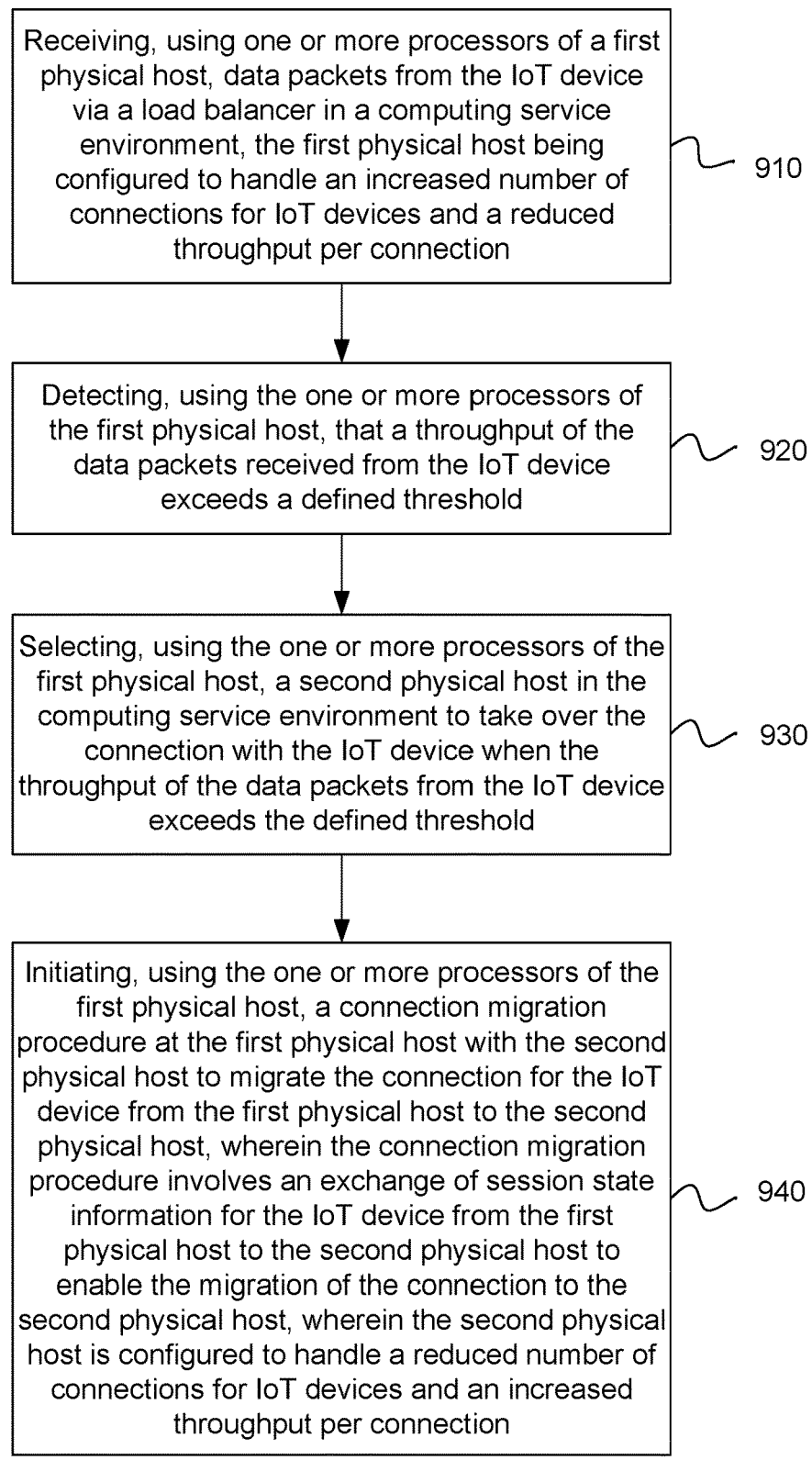
FIG. 9 is another flowchart of an example method for migrating a connection for an Internet of Things (IoT) device.

In one configuration, the data packets periodically received from the IoT device may include keep alive messages to maintain the connection between the IoT device and the first physical host. In addition, a recommended periodicity for the keep alive messages may be determined at the load balancer based on a network configuration associated with the IoT device, and the recommended periodicity may be transmitted from the load balancer to the IoT device FIG. 9 illustrates an example of a method for migrating a connection for an Internet of Things (IoT) device. Data packets may be received from the IoT device at a first physical host, as in block 910. The data packets may be received at the first physical host via a load balancer in a computing service environment. The IoT device may communicate with the first physical host via the load balancer using a connection between the IoT device and the first physical host. The data packets may include keep alive messages, sensor data, etc. In addition, the first physical host may be configured to handle an increased number of connections for IoT devices and a reduced throughput per connection.

A throughput of the data packets received from the IoT device may be detected as exceeding a defined threshold, as in block 920. More specifically, the first physical host may detect that the throughput of the data packets exceeds the defined threshold. In one example, the throughput of the data packets may exceed the defined threshold when the IoT device is sending sensor data to the first physical host. However, the throughput of the data packets received from the IoT device may be below the defined threshold when the IoT device is periodically transmitting keep alive messages to the first physical host via the load balancer.

A second physical host in the computing service environment may be selected to take over the connection with the IoT device when the throughput of the data packets from the IoT device exceeds the defined threshold, as in block 930. More specifically, the first physical host may select the second physical host based on a current load of the second physical host in relation to current loads for a plurality of physical hosts in the computing service environment. Alternatively, the first physical host may select the second physical host based on a type of data packets (e.g., video packets) received from the IoT device.

A connection migration procedure may be initiated at the first physical host with the second physical host to migrate the connection for the IoT device from the first physical host to the second physical host, as in block 940. The connection migration procedure may include an exchange of session state information for the IoT device from the first physical host to the second physical host to enable the migration of the connection to the second physical host. The second physical host may be configured to handle a reduced number of connections for IoT devices and an increased throughput per connection. The first physical host and the second physical host may directly communicate to migrate the connection based on a session initiation protocol (SIP). Moreover, additional data packets may be received at the first physical host from the IoT device via the load balancer in the computing service environment. A notification may be sent from the first physical host to the load balancer indicating that the connection for the IoT device is migrated to the second physical host. At that point, the load balancer may be configured to forward data packets from the IoT device to the second physical host based on the notification received from the first physical host.

In one example, a notification may be received from the second physical host indicating that a throughput of additional data packets for the IoT device is below the defined threshold. A connection migration procedure may be performed directly with the second physical host to migrate the connection for the IoT device from the second physical host back to the first physical host.

Figure 10:
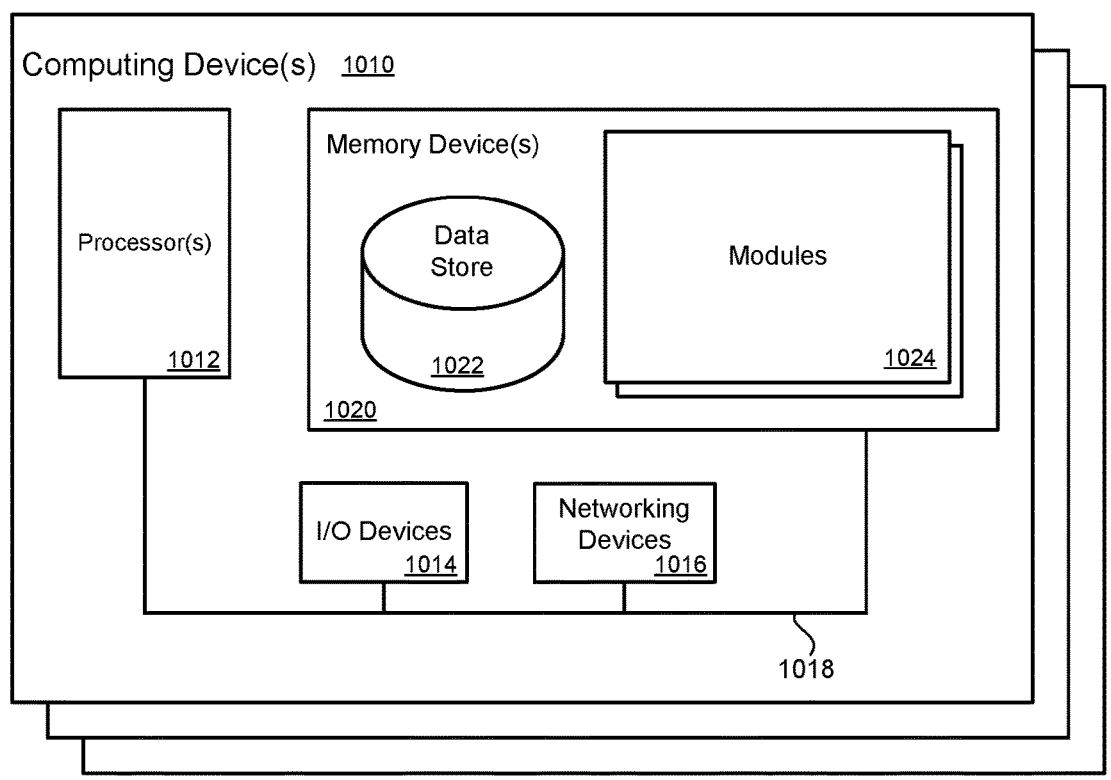
FIG. 10 is a block diagram that provides an example illustration of a computing device that may be employed in the present technology.

FIG. 10 illustrates a computing device 1010 on which modules of this technology may execute. A computing device 1010 is illustrated on which a high level example of the technology may be executed. The computing device 1010 may include one or more processors 1012 that are in communication with memory devices 1020. The computing device may include a local communication interface 1018 for the components in the computing device. For example, the local communication interface may be a local data bus and/or any related address or control busses as may be desired.

The memory device 1020 may contain modules 1024 that are executable by the processor(s) 1012 and data for the modules 1024. The modules 1024 may execute the functions described earlier. A data store 1022 may also be located in the memory device 1020 for storing data related to the modules 1024 and other applications along with an operating system that is executable by the processor(s) 1012.

Other applications may also be stored in the memory device 1020 and may be executable by the processor(s) 1012. Components or modules discussed in this description that may be implemented in the form of software using high programming level languages that are compiled, interpreted or executed using a hybrid of the methods.

The computing device may also have access to I/O (input/output) devices 1014 that are usable by the computing devices. An example of an I/O device is a display screen that is available to display output from the computing devices. Other known I/O device may be used with the computing device as desired. Networking devices 1016 and similar communication devices may be included in the computing device. The networking devices 1016 may be wired or wireless networking devices that connect to the internet, a LAN, WAN, or other computing network.

The components or modules that are shown as being stored in the memory device 1020 may be executed by the processor 1012. The term "executable" may mean a program file that is in a form that may be executed by a processor 1012. For example, a program in a higher level language may be compiled into machine code in a format that may be loaded into a random access portion of the memory device 1020 and executed by the processor 1012, or source code may be loaded by another executable program and interpreted to generate instructions in a random access portion of the memory to be executed by a processor. The executable program may be stored in any portion or component of the memory device 1020. For example, the memory device 1020 may be random access memory (RAM), read only memory (ROM), flash memory, a solid state drive, memory card, a hard drive, optical disk, floppy disk, magnetic tape, or any other memory components.

The processor 1012 may represent multiple processors and the memory 1020 may represent multiple memory units that operate in parallel to the processing circuits. This may provide parallel processing channels for the processes and data in the system. The local interface 1018 may be used as a network to facilitate communication between any of the multiple processors and multiple memories. The local interface 1018 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A method for migrating transmission control protocol (TCP) connections for Internet of Things (IoT) devices, the method comprising:
   receiving, using one or more processors of a load balancer, Internet Protocol (IP) packets that are keep alive messages from an IoT device for forwarding from the load balancer to a first physical host in a computing service environment, wherein the IoT device is communicating with the first physical host using a TCP connection between the IoT device and the first physical host;
   detecting, using the one or more processors of the load balancer, that a throughput of the IP packets exceeds a defined threshold when the IP packets received from the IoT device are no longer keep alive messages, wherein the IP packets from the IoT device are destined for the first physical host;
   selecting, using the one or more processors of the load balancer, the second physical host in the computing service environment to take over the TCP connection with the IoT device when the IP packets received from the IoT device are no longer keep alive messages; and
   initiating, using the one or more processors of the load balancer, a TCP connection migration procedure at the load balancer with the first physical host and the second physical host to migrate the TCP connection for the IoT device from the first physical host to the second physical host when the IP packets received from the IoT device are no longer keep alive messages, wherein the TCP connection migration procedure includes an exchange of session state information for the IoT device by the load balancer from the first physical host to the second physical host to enable the migration of the TCP connection to the second physical host.

2. The method of claim 1, further comprising:
   receiving additional IP packets from the IoT device; and
   forwarding the additional IP packets to the second physical host in the computing service environment based on the migration of the TCP connection for the IoT device to the second physical host.

3. The method of claim 1, further comprising:
   receiving additional IP packets from the IoT device for forwarding to the second physical host;
   detecting a throughput of the additional IP packets from the IoT device for the second physical host is below the defined threshold; and
   initiating a TCP connection migration procedure to migrate the TCP connection for the IoT device from the second physical host to the first physical host.

4. The method of claim 1, further comprising detecting that the throughput of the IP packets from the IoT device is below the defined threshold when the IoT device is periodically transmitting keep alive messages to the first physical host.

5. A method for migrating connections for Internet of Things (IoT) devices, the method comprising:
   receiving, using one or more processors of a computing system, data packets that are keep alive messages from an IoT device for forwarding to a first physical host in a computing service environment;
   determining, using the one or more processors of the computing system, to migrate a connection for the IoT device from the first physical host to a second physical host in the computing service environment when a throughput of the data packets received from the IoT device for the first physical host exceeds a defined threshold and the data packets received from the IoT device are not keep alive messages; and
   initiating, using the one or more processors of the computing system, a connection migration procedure with the first physical host and the second physical host to migrate the connection for the IoT device from the first physical host to the second physical host when data packets received from the IoT device are not keep alive messages, wherein the connection migration procedure includes an exchange of session state information for the IoT device from the first physical host to the second physical host to enable the migration of the connection to the second physical host, wherein the second physical host utilizes the session state information to take over the connection with the IoT device and the connection migration is transparent to the IoT device.

6. The method of claim 5, further comprising determining to migrate the connection for the IoT device to the second physical host based on an expected traffic pattern of the IoT device.

7. The method of claim 5, further comprising:
   forwarding data packets from the IoT device to the second physical host in accordance with the migration of the connection for a defined duration based on an expected traffic pattern of the IoT device or until a throughput of the data packets from the IoT device falls below the defined threshold; and migrating the connection for the IoT device from the second physical host to the first physical host.

8. The method of claim 5, further comprising selecting the second physical host in the computing service environment to take over the connection with the IoT device based on a current load at the second physical host in relation to current loads for a plurality of physical hosts in the computing service environment.

9. The method of claim 5, further comprising:
selecting the second physical host in the computing service environment to take over the connection with the IoT device based on a predicted traffic pattern of the IoT device in relation to predicted traffic patterns for a plurality of IoT devices that are currently connected to the first physical host; or
selecting the second physical host in the computing service environment to take over the connection with the IoT device based on a type of IoT device; or
selecting the second physical host in the computing service environment to take over the connection with the IoT device based on a type of data communicated from the IoT device.

10. The method of claim 5, wherein the connection migration procedure to migrate the connection for the IoT device from the first physical host to the second physical host is performed using a load balancer in the computing service environment.

11. The method of claim 5, wherein the connection for the IoT device is migrated from the first physical host to the second physical host using a session initiation protocol (SIP) at a load balancer.

12. The method of claim 5, wherein the connection for the IoT device is a session-based connection protocol.

13. The method of claim 5, wherein:
the first physical host is configured to handle an increased number of connections for IoT devices and a reduced throughput per connection; and
the second physical host is configured to handle a reduced number of connections for IoT devices and an increased throughput per connection.

14. The method of claim 5, further comprising:
extracting connection state information from the data packets received from the IoT device at the first physical host or the second physical host, wherein the data packets include a keep alive message; and
transferring the connection state information from a local memory of the first physical host or the second physical host to an external memory storage device in the computing service environment.

15. The method of claim 5, further configured to periodically receive the data packets from the IoT device, wherein the data packets include keep alive messages to maintain the connection between the IoT device and the first physical host.

16. A method for migrating a connection for an Internet of Things (IoT) device, the method comprising:

receiving, using one or more processors of a first physical host, data packets that are keep alive messages from the IoT device via a load balancer in a computing service environment, the first physical host being configured to handle an increased number of connections for IoT devices and a reduced throughput per connection as compared to a second physical host;

detecting, using the one or more processors of the first physical host, that a throughput of the data packets received from the IoT device exceeds a defined threshold when data packets received from the IoT device are not keep alive messages;

selecting, using the one or more processors of the first physical host, the second physical host in the computing service environment to take over the connection with the IoT device when data packets received from the IoT device are not keep alive messages; and initiating, using the one or more processors of the first physical host, a connection migration procedure at the first physical host with the second physical host to migrate the connection for the IoT device from the first physical host to the second physical host when data packets received from the IoT device are not keep alive messages, wherein the connection migration procedure includes an exchange of session state information for the IoT device from the first physical host to the second physical host to enable the migration of the connection to the second physical host.

17. The method of claim 16, further comprising:
receiving additional data packets from the IoT device via the load balancer in the computing service environment; and
sending a notification to the load balancer indicating that the connection for the IoT device is migrated to the second physical host, wherein the load balancer is configured to forward data packets from the IoT device to the second physical host based on the notification received from the first physical host.

18. The method of claim 16, further comprising:
receiving a notification from the second physical host indicating that a throughput of additional data packets for the IoT device is below the defined threshold; and
performing a connection migration procedure directly with the second physical host to migrate the connection for the IoT device from the second physical host to the first physical host.

19. The method of claim 16, further comprising detecting that the throughput of the data packets received from the IoT device is below the defined threshold when the IoT device is periodically transmitting keep alive messages to the first physical host via the load balancer.

20. The method of claim 16, wherein the second physical host is selected by the first physical host to take over the connection with the IoT device based on a present load at the second physical host in relation to present loads for a plurality of physical hosts in the computing service environment.

* * * * *